United States Patent [19]

Pflanz et al.

[11] Patent Number: 5,301,929
[45] Date of Patent: Apr. 12, 1994

[54] CONVEYING DEVICE FOR PUSH-TYPE OR CONTINUOUS-HEATING FURNACES

[75] Inventors: Rudolf Pflanz, Singen; Franz Engelberg, Konstanz, both of Fed. Rep. of Germany

[73] Assignee: Gautschi Electro-Fours SA, Taegerwilen, Switzerland

[21] Appl. No.: 978,633

[22] Filed: Nov. 19, 1992

[30] Foreign Application Priority Data

Nov. 21. 1991 [CH] Switzerland .................. 3414/91

[51] Int. Cl.⁵ ............................................. F27D 5/00
[52] U.S. Cl. .................................. 266/252; 266/274; 432/152
[58] Field of Search ............... 266/102, 249, 252, 274; 432/136, 121, 152

[56] References Cited

U.S. PATENT DOCUMENTS

| | | | |
|---|---|---|---|
| 4,444,557 | 4/1984 | Kimura et al. | 432/136 |
| 4,676,743 | 6/1987 | Ross | 432/152 |
| 5,104,314 | 4/1992 | Amore | 432/121 |

FOREIGN PATENT DOCUMENTS

| | | |
|---|---|---|
| 0108047 | 5/1984 | European Pat. Off. . |
| 2849655 | 5/1980 | Fed. Rep. of Germany . |
| 1261890 | 4/1961 | France . |
| 2498308 | 4/1981 | France . |
| 666117 | 6/1988 | Switzerland . |

Primary Examiner—Scott Kastler
Attorney, Agent, or Firm—Flynn, Thiel, Boutell & Tanis

[57] ABSTRACT

A crosshead shoe for the sliding transport on rails of a material to be annealed has, for the lateral guiding on the rails, an approximately U-shaped cross section with downwardly projecting legs. Special glide elements are provided on the side of the glide shoe which faces the glide plane, and/or the rail, which glide elements are designed so that as little wear and friction as possible occur during the movement of the crosshead shoes. The glide elements have glide surfaces for this purpose, the side surfaces of which glide surfaces are rounded and/or downwardly inclined, and/or the peripheral edges of which are associated with one another in obtuse angles or have a shape which is at least partially circular. These conditions exist, for example, in glide elements with polygonal or circular surfaces, which can be arranged in one or several rows or in a honeycomb pattern. Since important edges thus extend inclined to the direction of movement and furthermore no break-off-endangered acute edge angle exists, interferences (for example during travel over rail joints) do not act simultaneously onto the entire edge, so that edge break-offs can be substantially avoided. A flow channel is provided between the crosshead shoe and the base of the material being annealed, through which additional hot air is blown against areas of the material shielded from the main stream by the rail and the crosshead shoe.

17 Claims, 4 Drawing Sheets

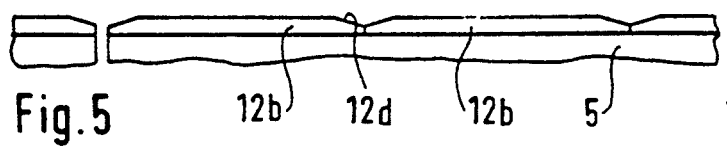
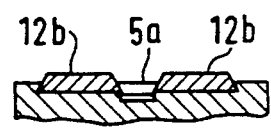
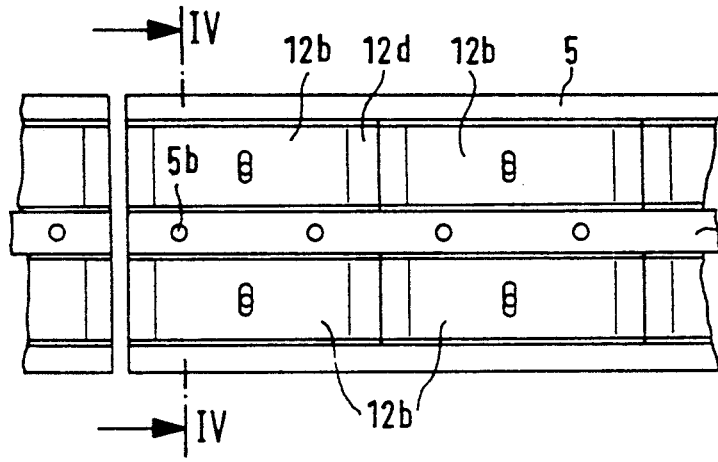
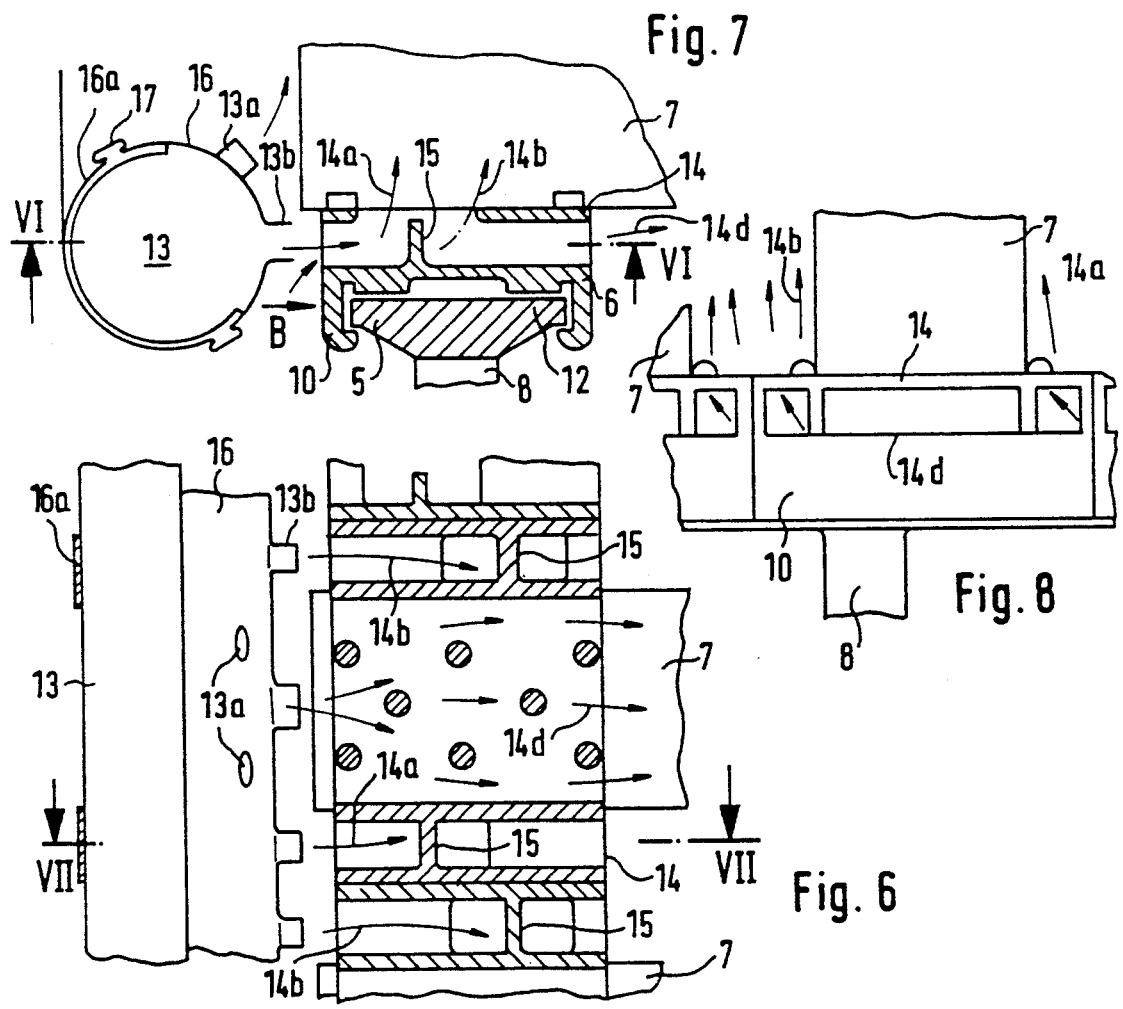

CONVEYING DEVICE FOR PUSH-TYPE OR CONTINUOUS-HEATING FURNACES

FIELD OF THE INVENTION

The present invention relates to a conveying device for push-type or continuous-heating furnaces.

BACKGROUND OF THE INVENTION

So-called push-type or continuous-heating furnaces are used for the heat treatment of billets, blocks and similar material of aluminum or aluminum alloys to be annealed, through which furnaces the material is moved and is thereby exposed to the annealing temperature of several hundred degrees.

The material is placed on crosshead shoes for its movement through the furnace. The crosshead shoes can be moved on rails of the furnace, for movement of which as a rule a hydraulic pushing device that can develop a pushing force of several hundred tons is utilized.

With long furnaces and thus long paths of movement for the heavily loaded crosshead shoes on the rails, significant problems exist for maintaining a lubricant supply for glide elements provided between the crosshead shoes and the rails in order to avoid wear of the glide elements. Problems also result from the fact that the rails and crosshead shoes shield the hot air flow circulated for the heat treatment from some parts of the material to be annealed, so that the areas of the material in the "lee" of the rails and crosshead shoes heat up slower.

Known designs try to solve the first-mentioned problem, for example by using as the lubricant a graphite-oil mixture of a dry, powdery graphite lubricant, which is applied to the rails from a storage chamber of the crosshead shoe when the crosshead shoe is placed onto the rails. This measure, however, is complicated during the practical operation and as a rule is only effective at the start of the movement. After only a few meters, the remainder of the path must be covered in a dry operation using much power and with much resulting wear of the glide surfaces.

It is also known to achieve an improved sliding capability with glide elements such as a glide bar or glide plates which are made of a colloidal graphite and are mounted on the underside of the crosshead shoe surface or on the rail. However, these glide elements cannot sufficiently withstand high loads. In particular, at the corners and edges, parts of the glide elements will break off, so that the glide surfaces are significantly damaged by broken pieces, rough broken edges and wear, and thus no longer fulfill their function as a "glide surface". Also, edges are dangerous which are arranged perpendicular to the direction of movement on the glide surfaces. In other attempts to reduce wear and keep broken pieces away from the glide surface, grooves which are inclined with respect to the direction of movement have been provided in rectangular glide plates. This measure, however, is hardly successful, because the inclined grooves in the rectangular glide plates result in angles under 90°, which makes the plates very susceptible to pieces breaking off. Furthermore, larger broken pieces can get caught in the grooves and thus can result in further destruction of the glide surface. Damaged or even destroyed glide elements result in a great resistance to movement, so that large forces are required in order to move the crosshead shoe with the material being annealed.

Significantly smaller forces for moving the crosshead shoes with the annealing material supported thereon are needed in the conveying device known from Swiss Patent No. 666 117, in which the crosshead shoe is supported on the rails by a continuous roller conveyor extending in the conveying direction. However, this solution is very complicated in its construction and is expensive both to manufacture and also to service.

A purpose of the present invention is to provide a conveying device of this type which avoids the disadvantages of the conventional constructions while providing movement between the crosshead shoes and the rails which is as wear-resistant and jerk-resistant as possible, and at the same time permitting a pairing of glide elements on the crosshead shoes and rails with a low friction coefficient.

SUMMARY OF THE INVENTION

The objects and purposes of the invention are met by providing a conveyor of the foregoing type, in which the glide surfaces of the glide elements are rounded and/or downwardly inclined in the area of their lateral edges, and/or the edges enclosing the glide surfaces are associated with one another in obtuse angles or are at least partly circular.

The fastening and design of the glide elements and their glide surfaces according to the invention reduces the danger of breaking edges and the danger of increased wear by inclining the glide surface of glide elements with a rectangular glide surface, in particular in the area of the front edge and the rear edge, so that at this much-stressed area at the start and end of each glide surface only a weakly defined edge with an edge angle of far beyond 90° (up to 170°) withstands the high load and is hardly endangered by material parts breaking off. If slide elements with polygonal surfaces are used, thus for example slide surfaces such as a hexagon or octagon, then the angles between the sides of each polygon surface are inherently larger than 90°, so that all edge angles of such glide elements are larger than 90° and thus have a suitable stability. Since important edges in such polygonal glide surfaces are inclined with respect to the direction of movement of the crosshead shoes, possible interferences, for example when travelling over rail joints, do not act simultaneously onto the entire edge, so that so-called slip-stick effects can be substantially avoided. This is also the case with circularly constructed glide elements.

The glide elements with polygonal and circular surfaces can also be mounted in a honeycomb pattern both on the underside of a crosshead shoe surface and also on the rails. When glide elements are arranged on the crosshead shoes and on the rails, it is possible to provide different glide surface structures and arrangements on the crosshead shoes and on the rails. If the same glide surface structures are used on the crosshead shoes and on the rails, their size or arrangement on the rails is advantageously different than that on the crosshead shoes. This avoids that, through congruent edges of the glide elements, interferences and movement obstacles originate simultaneously from the crosshead shoes and rails during the movement of the crosshead shoes.

A suitable material pairing of both the glide surface on the crosshead shoe underside and the rail glide surface takes care of favorable friction coefficients. Special glide elements on the rail and crosshead shoe enable a favorable material pairing independent of the material of the crosshead shoes and the rails which, for example, are mostly made of a heat-resistant steel. A small friction coefficient of the surfaces gliding on one another results, for example, from a material pairing of ceramic and cast iron.

The provision of glide elements on both the crosshead shoe and the rails permits a quick exchange of parts damaged by glide wear without having to exchange or repair larger structural parts. If the rails or crosshead shoes are made of a wear-resistant material, which with the glide elements as the counter-glide surface results in a low friction coefficient, then these glide elements can be selectively mounted only on the crosshead shoes or only on the rails.

If glide elements with circular surfaces are used, they can be supported with play on the underside of the crosshead shoe surface and/or on the rail (in openings of holding plates or with bolts) for rotation about the centerpoint of the circular glide surface. Thus, wear does not always occur at the same areas by forming of grooves (as is often the case with fixed, nonmovable glide elements), but rather the rotating capability of such a circular disk glide element results in an even wear and thus in a smoothing of the glide surfaces. A situation threatening corrosion or pitting occurring eccentrically with respect to the direction of movement causes a torque during the movement due to the increased friction forces, which torque can turn a rotatable circular disk glide element away from the endangered area.

A specific continuous rotary movement can be effected for a circular disk glide element where a longitudinal groove on the underside of the crosshead shoe and on the rail interrupts the gliding contact with one half of the glide element, so that in the loaded part of the glide element there is a torque which induces the rotary movement of the circular disk. Advantageous for the rotary movement of a circular disk glide element is when the circular disk periphery can, like a wheel, roll along a lateral guide surface. When the rotatable circular disk glide elements are arranged on the rail, the projecting crosshead shoe leg can serve as a guide. With rotatable circular disk glide elements on the crosshead shoe, the guide surface would then have to be provided on the rail.

A steady rotary movement of a circular disk glide element is favored when the disk side on the fastening surface has a slightly lower friction coefficient than the disk side on which the sliding movement is superposed. This can be done, for example, by coating one disk side, or by assembling one circular disk glide element out of two disks with different friction characteristics.

By superposing a steady rotary movement of the circular disk glide elements with a sliding movement, there occurs not only a smoothing of the glide surfaces but, on the average, lower relative speeds between the glide surfaces so that the wear of the glide elements is less and their life is thus longer.

The circular disk glide elements can also be arranged in several rows with space-saving designs when the disk pivot axes of the adjacent rows are offset by one half of a spacing between pivot axes of one row.

The rail and crosshead shoes cause, in particular when the glide surfaces for achieving a low surface load are designed with a corresponding large size, a "lee" for the circulating hot-air flow on the flow-off side, in the area of which the material being annealed is heated up slower than in the other areas. In order to overcome this disadvantage, the crosshead shoes can have, directly under the support surface for the material, suitably designed flow channels through which hot air is blown from special nozzles.

BRIEF DESCRIPTION OF THE DRAWINGS

Exemplary embodiments of the subject matter of the invention will be discussed in greater detail hereinafter in connection with the drawings, in which:

FIG. 3 is a top view of a rail with glide elements in a rectangular shape with inclined glide surfaces on the front and rear edges;

FIG. 4 is a cross-sectional view taken along the line IV—IV in FIG. 3;

FIG. 5 is a side view of the structure of FIG. 3;

FIG. 6 is a cross-sectional view taken along the line VI—VI in FIG. 7 to show crosshead shoe hot air channels and a pipe for additional air;

FIG. 7 is a cross-sectional view taken along the line VII—VII in FIG. 6;

FIG. 8 is a side view taken in the direction of the arrow B in FIG. 7;

DETAILED DESCRIPTION

Figure 1:
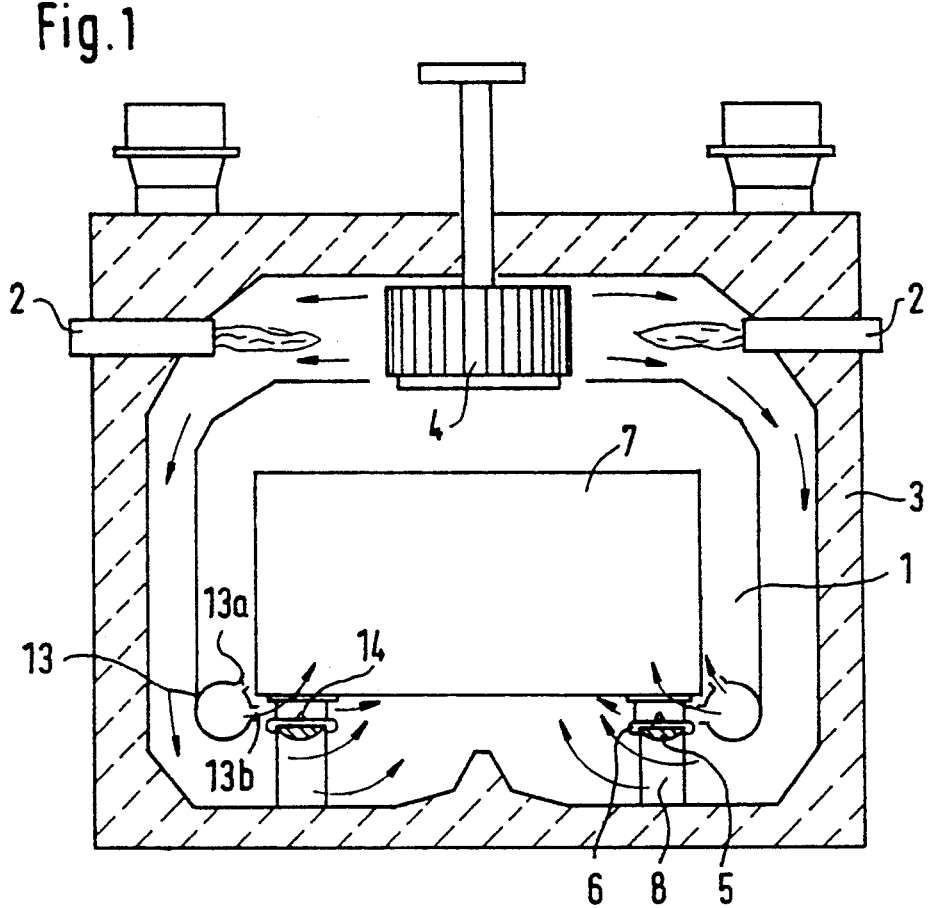
FIG. 1 is a diagrammatic cross-sectional side view of a push-type furnace with an inventive conveying device and additional air channels.

The push-type furnace illustrated in a front cross-sectional view in FIG. 1 has an annealing chamber 1 in which hot gases heated up by burners 2 in the furnace housing or shell 3 are circulated by a fan 4.

Rails 5 of a conveying device are supported on pedestals 8 provided near the bottom of the furnace. (The rails extend perpendicular to the drawing plane over a length of often more than 20 meters.) This conveying device includes one or more crosshead shoes 6, onto which material 7 to be annealed, for example billets or blocks, is placed, which material is moved through the furnace as has already been discussed in detail in the introductory portion of this application.

FIG. 1 shows also diagrammatically a pipe 13 with nozzles 13a and 13b, through which additional air is blown against the areas of the material 7, here a billet, which lie otherwise in the "lee" of the rails 5 and the glide shoes 6. The end walls of the material 7 are hereby directly blown against from the nozzles 13a, and the nozzles 13b blow air, through flow channels 14 in the crosshead shoe 6, against the sidewalls of the material 7 in the area of the crosshead shoe 6 and against the underside of the material 7. The additional air flow is moved by an additional fan (not illustrated) into the pipe 13.

Figure 2:
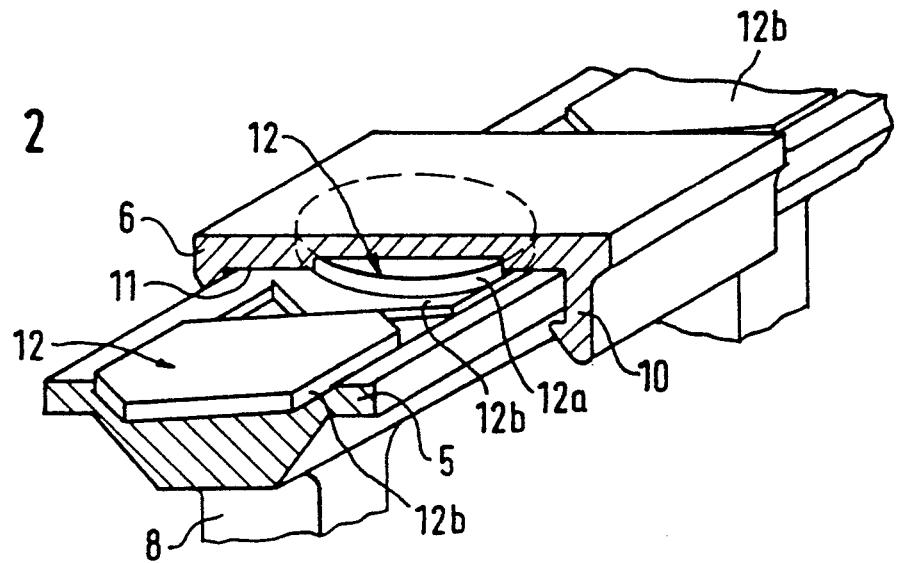
FIG. 2 is a fragmentary perspective view of a crosshead shoe and a rail with glide elements.

FIG. 2 shows in detail the design of conventional crosshead shoes 6 having an essentially U-shaped cross section with downwardly projecting legs 10, which are used for the lateral guiding on the rail 5.

Figure 11:
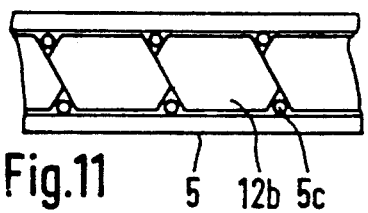
FIG. 11 is a top view of a rail with glide elements having parallelogram surfaces with cut-off "pointed corners"

Glide elements identified in general with reference numeral 12 are provided between the crosshead shoe 6 and the rail 5, namely a circular-disk-shaped glide element 12a arranged on the inner crosshead surface 11 of the crosshead shoe 6 and plate-shaped glide elements 12b arranged one after the other in the longitudinal direction along the rail 5. The glide elements 12b arranged on the rail 5 have in the exemplary embodiments of FIGS. 2 and 11 a glide surface like a parallelogram, the "pointed corners" of which are cut off. Space becomes available in the area of these cut-off "pointed corners", where debris from wear can accumulate and can escape through openings 5c provided in the rails 5 for this purpose. Damage to the glide surfaces caused by wear is thus reduced.

The perspective illustration of FIG. 2 shows that, due to the different shapes of the glide elements 12a and 12b, the edges of the glide elements overlap continually at different points during the movement of the crosshead shoes. This significantly reduces the stress on the edges and thus their wear.

Also, in the case of glide elements with rectangular glide surfaces, it is possible to reduce the danger to the glide surface edges when the angle between the glide surface and all side surfaces is clearly larger than 90°, as can be seen in the exemplary embodiment of FIGS. 3, 4 and 5. Aside from the lateral supporting surfaces of the glide elements 12b, which are inclined according to FIG. 4 so that they can be fastened with a fastening bar 5a in a "dovetail" groove of the rail (FIG. 5), the glide surfaces of the glide elements 12b are also slightly inclined in the area of the front and rear edges 12d. An obtuse edge with an edge angle in the gliding surface so that these edges are hardly in danger.

The glide elements 12b, which for example are arranged here on the rail 5, can in principle also be provided in a suitable manner on the crosshead underside 11 instead of the glide elements 12a shown in this area in FIG. 2. The same is true also for the embodiments illustrated in FIGS. 11 to 17.

Figure 12:
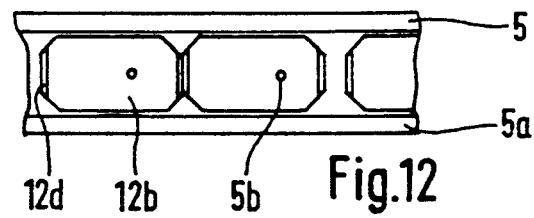
FIG. 12 is a top view of a rail with glide elements having elongated octagonal surfaces.

FIG. 12 shows glide elements fastened on the rail 5, which glide elements have rectangular surfaces with corners which are cut off to define an elongated octagonal glide surface with inclined surfaces 12d on the front and rear edges. The lateral fastening is done in a tapered groove of the rail 5 and/or as shown here with a fastening bar 5a. Supporting bolts 5b sufficiently lower than the glide surface take over the holding in the direction of movement. In consideration of the heat expansion of rail 5 and glide elements 12, it is necessary to provide sufficient space for expansion between the glide elements so that thermal stress will not occur.

Figure 13:
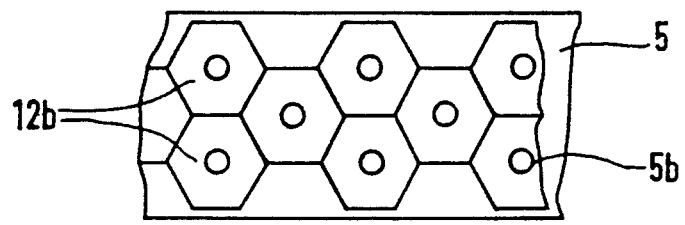
FIG. 13 is a top view of a rail with glide elements having hexagonal surfaces arranged in a honey-comb structure.

FIG. 13 shows the glide elements 12b with hexagonal glide surfaces arranged in a honeycomb structure and held by bolts 5b countersunk below the glide surface. This arrangement also provides sufficient play at the contact edges of the hexagonal glide element disks to avoid large contact pressures during heat expansion. A slight play between the supporting bolt 5b and the glide element 12 enables an easy back and forth movement around the supporting bolt, so that a certain smoothing effect of the glide surfaces is made possible.

Figures 14, 15:
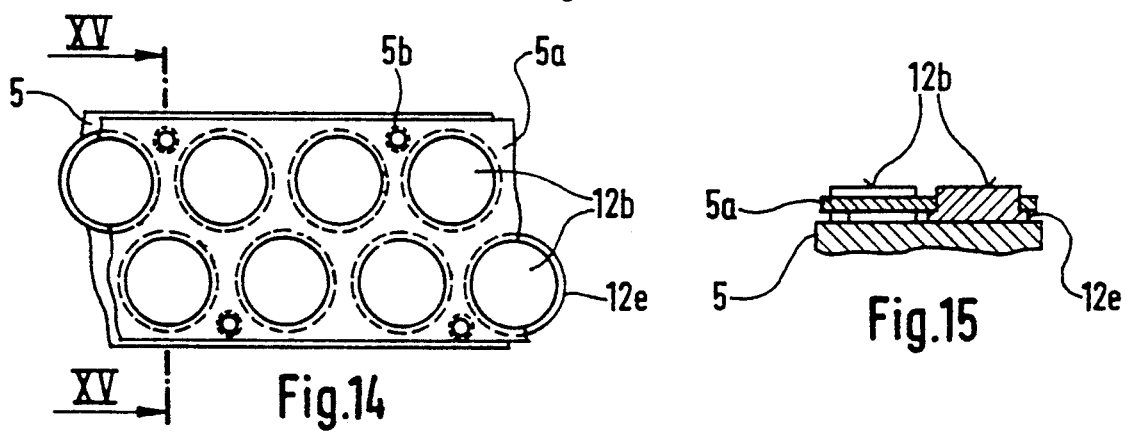
FIG. 14 is a top view of a rail with glide elements which are circular disks rotatably supported by a holding plate.
FIG. 15 is a sectional view taken along the line XV—XV in FIG. 14.
Figures 16, 17:
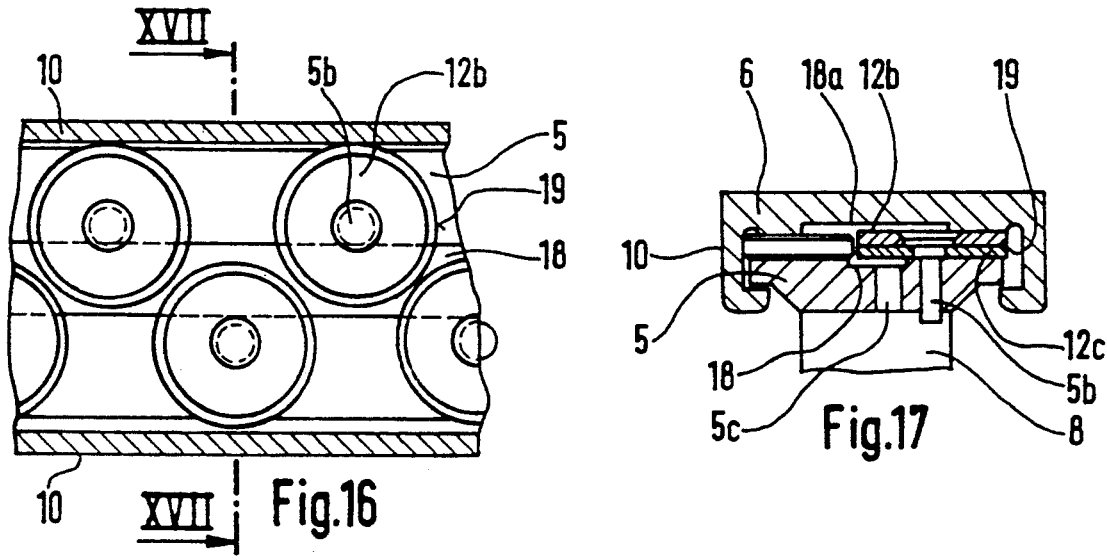
FIG. 16 is a top view of a rail with glide elements which are circular disks having two disk parts made of different materials and rotatably supported by bolts.
FIG. 17 is a sectional view taken along the line XVII—XVII in FIG. 16.

The embodiments of FIGS. 14 to 16 show the glide elements 12b as circular disks. The circular disk glide elements 12b in FIGS. 14 and 15 have a flange 12e on the side of the rail 5 so that a holding plate 5a, with openings into which the upper parts of the glide elements 12b just fit with play, rotatably positions these elements (see also the cross section XV—XV in FIG. 15). By using these circular disk glide elements which are each rotatable about a vertical axis, local irregularities acting with large forces on the glide surfaces effect a turning of the glide elements, thus reducing the danger of damage. The rotary movement superposed over the gliding movement causes furthermore a certain smoothing of the surfaces gliding on one another.

The circular disk glide elements 12 in FIGS. 16 and 17 are rotatably supported on the rail 5 by bolts 5b. In order to achieve an eccentric application of the frictional forces to the disk, longitudinal grooves 18 and 18a are provided in the rail 5 and in the crosshead surface of the crosshead shoe 6, so that a frictional contact exists only on approximately one half of the circular disk glide elements. A roller ring 19 is provided on the circumference of the glide element wheel disk, which roller ring can, for example, roll along the downwardly projecting crosshead shoe leg. The pivot axis of the glide element wheel disk must thereby be chosen so that the roller ring 19 projects laterally beyond the rail edge.

Very favorable for the rotary movement of the glide element wheel disk is the provision of a second disk 12c (see FIG. 17) of a different material (or having a special coating) with a small friction coefficient, which second disk is fastened on the underside of the wheel disk. With a rotary movement of the glide elements thus superposed during the transporting movement of the crosshead shoes, there takes place a smoothing of the glide surfaces and a transport of the debris caused by wear into a lower longitudinal groove 18, from which this debris and contaminants can fall downwardly through openings 5c. The continual smoothing of the glide surfaces results in less friction during the transporting movement and also in a reduction in the tendency for corrosion and slip-stick effects.

A modification of these sandwich wheel disks occurs when the upper gliding wheel disks 12, in most cases made of a material with good sliding but less breakage-resistant characteristics, are each fastened on a disk 12c with a high strength or a disk 12c designed with a hub (not illustrated in FIG. 17) or with a spacer ring between disk 12c and the seat of the supporting bolt 5b on the rail, enabling a rotation of this sandwich wheel disk design with a small restraining friction torque.

Use of the mentioned longitudinal grooves 18 and 18a, the roller ring 19 and the glide element double wheel disk 12 and 12c is in principle also possible in the embodiment illustrated in FIGS. 14 and 15.

Balls or radial cylindrical rollers (not illustrated) can also be provided between the two wheel disks 12 and 12c of this modified embodiment. The balls or rollers 12c can be arranged in several concentric circles. They transmit forces between the underside of the crosshead shoe and the rail, and roll during the movement of the crosshead shoe 5 similar to the balls of a ball bearing. The balls or the rollers rotate with the circular disk into the area of the longitudinal grooves 18 and 18a, where they have no contact with the crosshead shoe and the rail while rotating back into the glide area of the rails.

FIGS. 6 to 10 show in greater detail through suitable cross-sectional views the flow channels in the crosshead shoes, through which channels the additional air can be blown against the areas of the billets protected by the rails and crosshead shoes.

Thus, FIG. 7 shows a cross section of the rail 5, the crosshead shoe 6 with a flow channel 14, in which exists a guide rib 15, and the pipe 13 for the additional air.

Additional air flows from the pipe 13 through the upwardly inclined nozzles 13a against the end wall of the material 7 to be annealed. Additional air flows through the different horizontal nozzles 13b into the two air channels arranged laterally of the material 7, where the additional air streams 14a and 14b on both sides are upwardly deflected by the staggered ribs 15 and flow along the sidewalls of the material 7 carrying along the surrounding hot air. A stream of additional air flows from one or more horizontal nozzles 13b arranged therebetween horizontally through a flow channel directly underneath the thin billet base supported with bolts, as is shown in the horizontal cross section of FIG. 6, and thus reaches the underside of the material 7.

FIG. 7 shows that the upper quarter of the part of the pipe 13 facing the annealing material 7 is open and is covered with approximately semicircular pipe parts 16, on which the blow nozzles 13a and 13b are provided. These blow nozzle pipe parts 16 are releasably held by pipe clamps 16a having clamping devices 17 after suitable adjustment of the blow stream to the crosshead shoe flow channels 14 and the end wall of the material 7. This makes it possible, based on the particular material 7 in the furnace, to optimally adjust the blow nozzles 13a and 14b.

Figure 9:
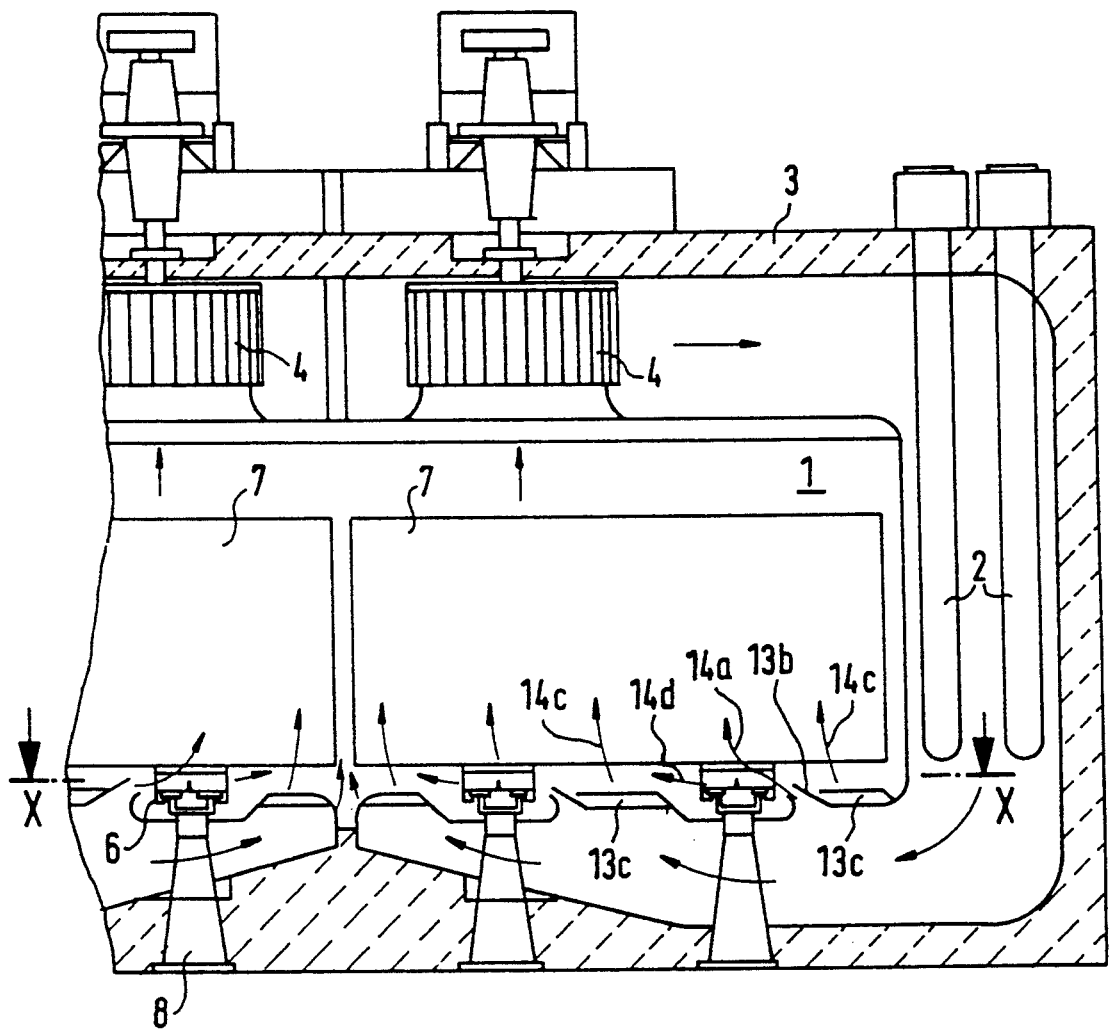
FIG. 9 is a partial cross-sectional view of a push-type furnace with a nozzle box and a hot-air flow through the crosshead shoes.
Figure 10:
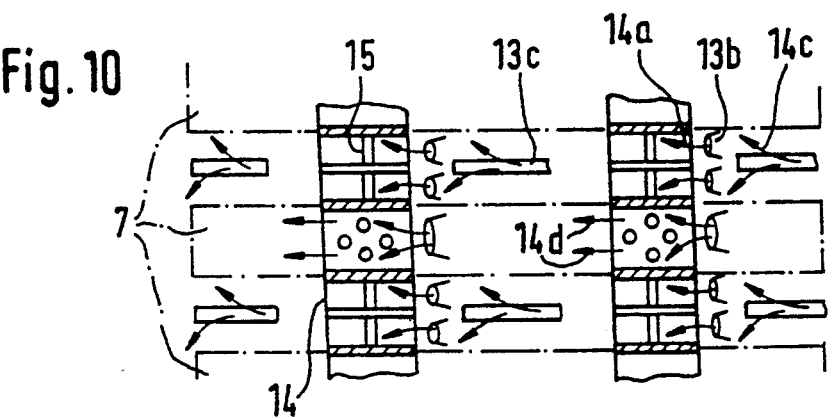
FIG. 10 is a view taken along the line X—X in FIG. 9 to show the crosshead shoe hot-air channels.

Crosshead shoes with flow channels 14 can also be utilized in embodiments which provide the entire hot air blast against the material 7 from below through nozzle boxes, as is illustrated in FIGS. 9 and 10. In addition to the slot nozzles 13c, which blow hot air between the sidewalls of the material 7, nozzles 13b are arranged to effect slightly upwardly inclined blowing into the crosshead shoe flow channels 14 in the aforementioned manner.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property of privilege is claimed are defined as follows:

1. In a conveying device for furnaces, for the gliding transport through the furnace of material to be annealed which is supported on at least one crosshead shoe having an approximately U-shaped cross section with downwardly projecting legs for the laterally guided support of the crosshead shoe on rails or on guide rails arranged on said rails, wherein glide elements for improving the gliding capability between the crosshead shoe and the rails are provided on one of the inner crosshead surface of the crosshead shoe and the rails, the improvement comprising means for resisting breakage of said glide elements, including one of: (1) the glide surfaces of the glide elements being rounded, (2) the glide surfaces being downwardly inclined in the area of their lateral edges, (3) the edges enclosing the glide surfaces being associated with one another in obtuse angles, and (4) the edges enclosing the guide surfaces being at least partly circular.

2. A conveying device according to claim 1, wherein the glide elements are arranged as plates or disks in one or more rows one after another in a direction of movement.

3. A conveying device according to claim 2, wherein the glide elements are rectangular or parallelogram plates with cut-off pointed corners.

4. A conveying device according to claim 2, wherein the glide elements have the shape of equilateral polygons or circular disks.

5. A conveying device according to claim 4, wherein the glide elements are arranged in a honeycomb pattern.

6. A conveying device according to claim 1, wherein the glide elements are made of a material which, at a furnace chamber temperature of approximately 600° to 700°, has an approximately constant low friction coefficient.

7. A conveying device according to claim 1, wherein the glide elements include members which are made of ceramic and which cooperate with glide surfaces or other glide elements made of cast iron.

8. A conveying device according to claim 1, wherein the glide elements are each a disk fastened with play by a bolt at the center of the disk or by a holding plate having openings which each rotatably receive an upper disk part with the glide surface, so that each disk can carry out a rotary movement or at least a slight swivelling movement around the centerpoint thereof.

9. A conveying device according to claim 8, wherein the glide elements are designed as wheel disks having approximately one half which remains contact free due to respective longitudinal grooves provided in the rail and in the underside of the crosshead shoe, so that the resulting friction forces each eccentrically engage the wheel disk and thus effect a rotary movement.

10. A conveying device according to claim 9, wherein means along which the wheel disks can roll extend in the longitudinal direction on the part having the counter-glide surfaces for the wheel disks.

11. A conveying device according to claim 9, wherein the wheel disks are differently coated on opposite sides or are assembled as sandwich disks having at least two disks of different material, with the wheel disk facing the fastening side having the lesser friction coefficient.

12. A conveying device according to claim 11, wherein said sandwich disks each include an upper disk and a further disk below the upper disk, the upper disk being made of a less breakage-resistant but good glideable material and being fastened on the further disk, the further disk having a high strength or a hub or a spacer ring between the further disk and the seat of the supporting bolt to enable rotation of the upper and further disks with a small restraining frictional torque.

13. A conveying device according to claim 11, wherein balls or cylindrical rollers arranged radially with respect to the axis of rotation of the disk are provided in cavities open toward both outer sides of the disk and arranged in one or more circles concentric with respect to the axis of rotation between a wheel disk and a further disk, with the ball or roller diameters being greater than the thickness of the two connected wheel disks so that the balls or rollers roll along on the rail and the underside of the crosshead shoe.

14. A conveying device according to claim 1, wherein cavities designed as flow channels are provided between the crosshead shoe surface and the base of the material to be annealed so that hot air blowing in from special nozzles flows tangentially directly under the underside of the material and can be deflected upwardly by means of a rib in the outer partially open flow channels against the sidewall of the material in the area of the openings in the crosshead shoe part projecting beyond the material width.

15. A conveying device according to claim 14, wherein a pipe for additional air is provided parallel to the rail in the inlet area of the main hot air stream into the annealing chamber, and including nozzles on the wall of the pipe which are directed approximately horizontally toward the flow channels in the crosshead shoes and are upwardly inclined toward the end wall of the material to be annealed.

16. A conveying device according to claim 15, wherein pipe wall pieces having the nozzles thereon are fastened adjustably with pipe clamps on the pipe.

17. A conveying device according to claim 1, wherein said edges enclosing the glide surfaces include edges which are inclined with respect to the direction of movement of the crosshead shoes.

* * * * *